United States Patent
Fukui et al.

(10) Patent No.: US 10,006,411 B2
(45) Date of Patent: Jun. 26, 2018

(54) FUEL VAPOR TREATMENT SYSTEM

(71) Applicant: TOYOTA JIDOSHA KABUSHIKI KAISHA, Toyota-shi, Aichi-ken (JP)

(72) Inventors: Keita Fukui, Fujinomiya (JP); Yuusaku Nishimura, Toyota (JP); Tatsuhiko Akita, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 110 days.

(21) Appl. No.: 15/052,955

(22) Filed: Feb. 25, 2016

(65) Prior Publication Data

US 2016/0265480 A1 Sep. 15, 2016

(30) Foreign Application Priority Data

Mar. 10, 2015 (JP) ................. 2015-047244

(51) Int. Cl.
*F02M 33/02* (2006.01)
*F02M 25/08* (2006.01)
(Continued)

(52) U.S. Cl.
CPC ....... *F02M 25/0818* (2013.01); *B60K 15/035* (2013.01); *B60K 15/03504* (2013.01);
(Continued)

(58) Field of Classification Search
CPC .......... F02M 25/0818; F02M 25/0809; F02M 25/0836; F02M 25/0854; F02M 25/089; F02D 41/003; B60K 15/03519
(Continued)

(56) References Cited

U.S. PATENT DOCUMENTS 5,427,075 A * 6/1995 Yamanaka ......... F02M 25/0809
  123/198 D
5,494,021 A * 2/1996 Yoneyama ......... F02M 25/0809
  123/520
(Continued)

FOREIGN PATENT DOCUMENTS

CN 103498739 A 1/2014
JP 10259765 A * 9/1998 ............. F02M 25/08
(Continued)

*Primary Examiner* — Hung Q Nguyen
*Assistant Examiner* — Anthony Taylor, Jr.
(74) *Attorney, Agent, or Firm* — Finnegan, Henderson, Farabow, Garrett & Dunner, LLP

(57) ABSTRACT

A processor may perform a purging process, which may introduce fuel vapor adsorbed by a canister into an intake passage. The processor may identify clogging of a purge passage based on a decrease amount of the pressure in the canister that results from execution of the purging process. The processor may open an isolation valve when the pressure in a fuel tank is less than or equal to a first pressure, which is less than an atmospheric pressure, and close the isolation valve when the pressure in the fuel tank is greater than or equal to a second pressure, which is greater than the first pressure and less than the atmospheric pressure. The processor may disable the purging process at least in a period from when the processor closes the isolation valve to when a prescribed time has elapsed from the closing of the isolation valve.

6 Claims, 4 Drawing Sheets

(51) Int. Cl.
 *F02D 41/00* (2006.01)
 *B60K 15/035* (2006.01)
(52) U.S. Cl.
 CPC ...... *B60K 15/03519* (2013.01); *F02D 41/003* (2013.01); *F02M 25/0809* (2013.01); *F02M 25/089* (2013.01); *F02M 25/0836* (2013.01); *F02M 25/0854* (2013.01)
(58) Field of Classification Search
 USPC .................................................. 123/519
 See application file for complete search history.

(56) References Cited

U.S. PATENT DOCUMENTS

| | | | | |
|---|---|---|---|---|
| 5,497,754 A * | 3/1996 | Ito | ................... | B60K 15/03519 123/520 |
| 5,816,222 A * | 10/1998 | Kidokoro | ........... | F02M 25/0809 123/357 |
| 5,845,625 A * | 12/1998 | Kidokoro | ........... | F02M 25/0836 123/520 |
| 6,041,761 A * | 3/2000 | Uto | ................... | F02D 41/0032 123/516 |
| 6,192,742 B1 * | 2/2001 | Miwa | ................. | F02M 25/0809 123/520 |
| 6,679,214 B2 * | 1/2004 | Kobayashi | ............. | B60K 6/485 123/179.4 |
| 6,814,063 B2 * | 11/2004 | Kawano | ................. | F02M 25/08 123/516 |
| 7,204,239 B2 * | 4/2007 | Iriyama | ............. | F02M 25/0809 123/198 D |
| 8,273,164 B2 * | 9/2012 | Makino | ............. | B01D 53/0415 123/519 |
| 8,447,495 B2 * | 5/2013 | Pearce | ............ | B60K 15/03504 123/516 |
| 8,813,726 B2 | 8/2014 | Nagasaku | | |
| 8,960,163 B2 * | 2/2015 | Iwaya | .................... | F02M 25/08 123/520 |
| 9,027,533 B2 * | 5/2015 | Pifher | .................... | F02M 33/02 123/519 |
| 9,422,895 B2 * | 8/2016 | Reddy | ................. | F02M 25/089 |
| 2001/0054415 A1 * | 12/2001 | Hanai | ................ | F02M 25/0809 123/520 |
| 2012/0222657 A1 * | 9/2012 | Sano | .................... | F02M 25/089 123/520 |
| 2013/0104858 A1 | 5/2013 | Iwaya et al. | | |

FOREIGN PATENT DOCUMENTS

| | | |
|---|---|---|
| JP | 2001-193582 | 7/2001 |
| JP | 2002-81349 | 3/2002 |
| JP | 2010-242723 | 10/2010 |
| JP | 2013-92135 | 5/2013 |

* cited by examiner

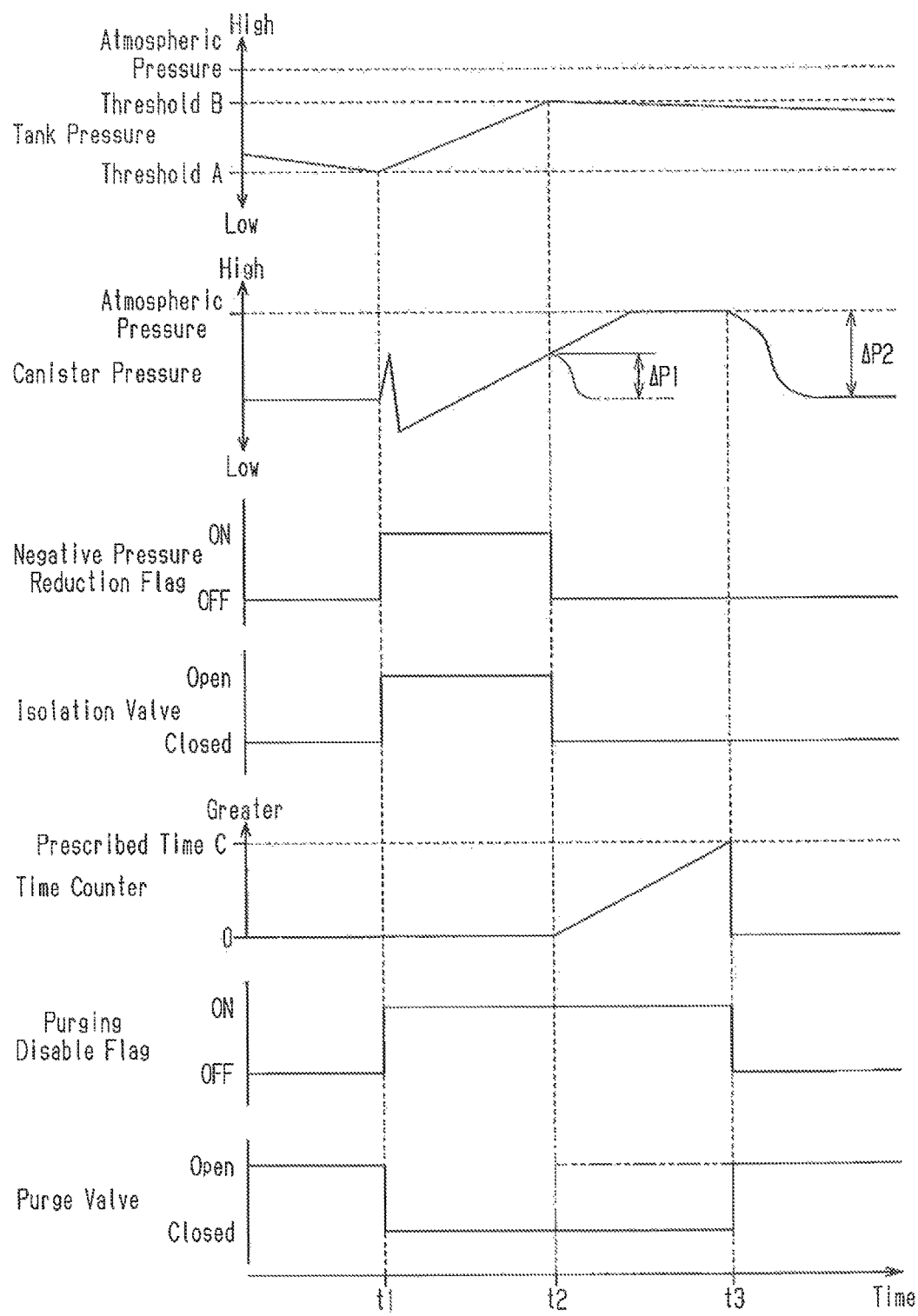

FUEL VAPOR TREATMENT SYSTEM

BACKGROUND

The present disclosure relates to a fuel vapor treatment system installed in an internal combustion engine.

An internal combustion engine of a vehicle may include a fuel vapor treatment system having a canister that adsorbs fuel vapor to limit emission of fuel vapor generated in the fuel tank into the atmosphere.

For example, Japanese Laid-Open Patent Publication No 2010-242723 describes a fuel vapor treatment system that includes a canister, a vapor passage which introduces fuel vapor generated in the fuel tank into the canister, and an isolation valve which opens and closes the vapor passage. The fuel vapor treatment system also includes a purge passage that introduces fuel vapor desorbed from the canister into the intake passage of the internal combustion engine, a purge valve which is located in the purge passage and adjusts the flow rate of fuel vapor, and an outside air introduction passage, which is connected to the canister and introduces outside air into the canister.

There is a limit to the amount of fuel vapor the canister can adsorb. Thus, the fuel vapor treatment system opens the purge valve to desorb fuel vapor from the canister while the engine is running. The desorbed fuel vapor is introduced into the intake passage through the purge passage and burned in the combustion chamber. Such a process is referred to as a purging process and maintains the adsorption capacity of the canister.

The fuel vapor treatment system of the '723 publication opens the isolation valve when fuel consumption or decrease in the fuel temperature generates negative pressure (for example, pressure lower than the atmospheric pressure) in the fuel tank. This returns the fuel vapor adsorbed by the canister to the fuel tank. When the pressure in the fuel tank becomes the atmospheric pressure, the isolation valve is closed to seal the fuel tank. The isolation valve is thus operated to confine fuel vapor within the fuel tank and reduce the amount of fuel vapor adsorbed by the canister. Thus, the adsorption capacity of the canister may be maintained even when the purging process is performed less frequently.

In order to confine fuel vapor within the sealed fuel tank, it may be desirable that the pressure in the fuel tank be less than the atmospheric pressure, that is, be negative pressure. Thus, the isolation valve should likely be closed when the pressure in the fuel tank becomes a predetermined negative pressure near the atmospheric pressure, instead of when the pressure in the fuel tank reaches the atmospheric pressure. However, closing the isolation valve under such a pressure condition may cause the following problem.

That is, when the purging process starts and the purge valve is opened, the negative pressure in the intake passage acts on the pressure in the canister, which is equivalent to the atmospheric pressure. Thus, the pressure in the canister (hereinafter referred to as canister pressure) may significantly decrease compared to the pressure immediately before starting the purging process. If the purge passage is clogged, the amount of fuel vapor flowing through the purge passage may be reduced, lowering the decrease amount of the canister pressure.

As such, the fuel vapor treatment system monitors the decrease amount of canister pressure after starting the purging process in order to identify whether the purge passage is clogged.

But when the isolation valve is closed at the predetermined negative pressure near the atmospheric pressure, the canister pressure immediately after closing the isolation valve is negative pressure. Thus, if a purging process is started immediately after closing the isolation valve, the decrease amount of canister pressure after starting the purging process is small since the canister pressure immediately before starting the purging process is negative pressure. This may cause unclogged purge passage to be wrongly identified as clogged.

SUMMARY

In accordance with embodiments of the present disclosure, a fuel vapor treatment system is provided that may reduce wrong diagnoses regarding clogging of a purge passage even when negative pressure is maintained in the fuel tank.

In accordance with one aspect of the present disclosure, a fuel vapor treatment system may include a fuel tank that stores fuel for an internal combustion engine, a canister that adsorbs fuel vapor generated in the fuel tank, a vapor passage that provides communication between the fuel tank and the canister, a purge passage that provides communication between the canister and an intake passage of the internal combustion engine, an isolation valve that opens and closes the vapor passage, a purge valve that adjusts a flow rate of fuel vapor flowing through the purge passage, an outside air introduction passage that introduces outside air into the canister, a tank pressure sensor that detects pressure in the fuel tank, a canister pressure sensor that detects pressure in the canister, and a processor. The processor is configured to perform: a purging process, in which the processor opens the purge valve while the internal combustion engine is running to introduce the fuel vapor adsorbed by the canister into the intake passage; and a diagnosis process, in which the processor identifies clogging of the purge passage based on a decrease amount of the pressure in the canister that results from execution of the purging process. The processor may be configured to further perform: an isolation valve operation process, in which the processor opens the isolation valve when the pressure in the fuel tank is less than or equal to a first pressure, which is less than an atmospheric pressure, and the processor closes the isolation valve when the pressure in the fuel tank is greater than or equal to a second pressure, which is greater than the first pressure and less than the atmospheric pressure; and a purging disabling process, in which the processor disables the purging process at least in a period from when the processor closes the isolation valve in the isolation valve operation process to when a prescribed time has elapsed from the closing of the isolation valve.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure may be understood by reference to the following description together with the accompanying drawings:

FIG. 4 is a timing chart showing the operation of the negative pressure reduction control of the embodiment.

DETAILED DESCRIPTION

Referring to FIGS. 1 to 4, embodiments of a fuel vapor treatment system will now be described. In the following description, "pressures" other than "negative pressure" refer to absolute pressures rather than gauge pressures.

Figure 1:
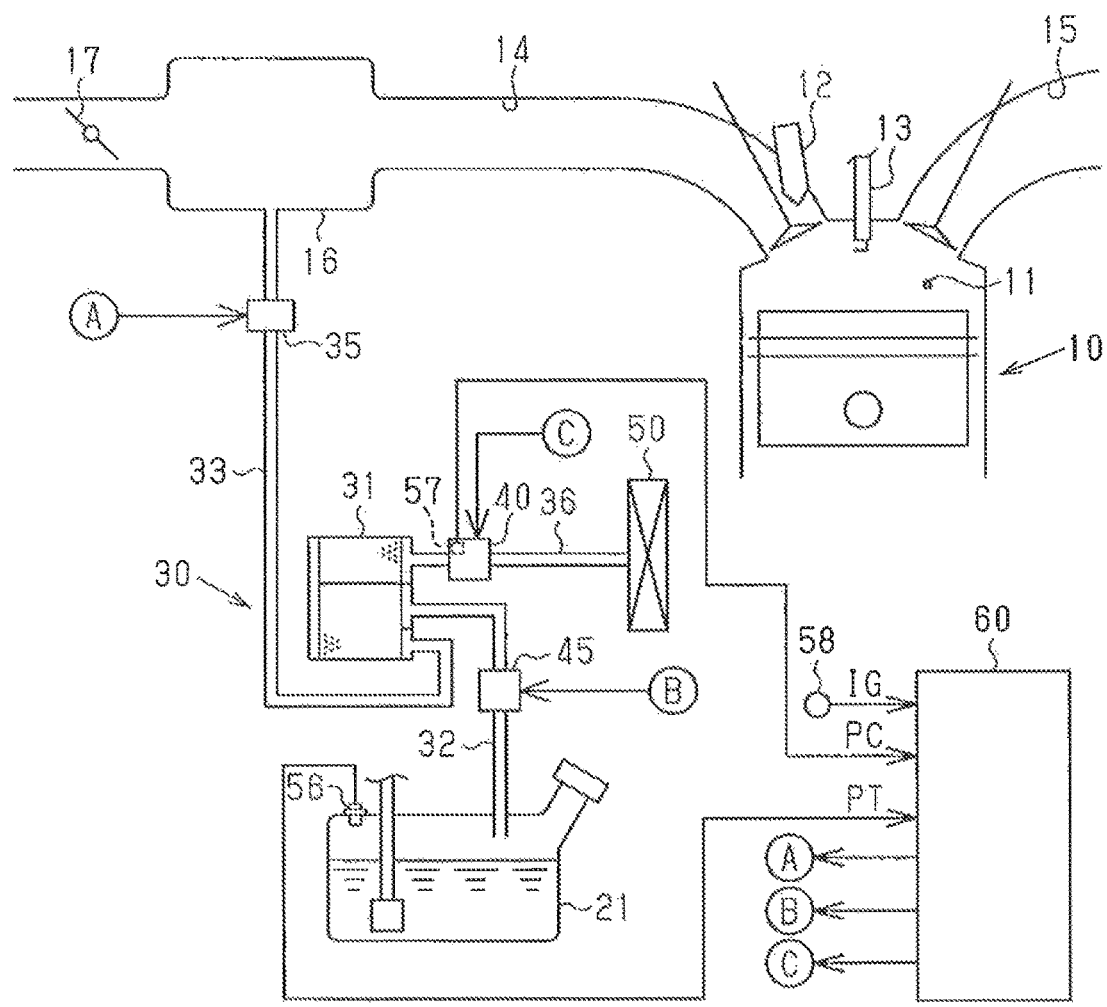
FIG. 1 is a schematic diagram showing the structure of an internal combustion engine that uses a fuel vapor treatment system according to one embodiment of the present disclosure.

FIG. 1 schematically shows the structure of a vehicle engine 10 that uses the fuel vapor treatment system of the present embodiment.

As shown in FIG. 1, the internal combustion engine (hereinafter referred to as engine) 10 includes a fuel tank 21, which stores fuel, a fuel injection valve 12, which injects fuel into a combustion chamber 11, and a spark plug 13, which ignites mixture gas of intake air and the injected fuel. The fuel in the fuel tank 21 is sent to the fuel injection valve 12 through a fuel supply passage, which is connected to the fuel tank 21. The fuel tank 21 includes a tank pressure sensor 56 that detects tank pressure PT, which is the pressure in the fuel tank 21.

The combustion chamber 11 is connected to an intake passage 14 and an exhaust passage 15. A surge tank 16, which is a part of the intake passage 14, is located in an intermediate section of the intake passage 14. A throttle valve 17, which adjusts the amount of intake air, is located upstream of the surge tank 16 in the intake passage 14.

The engine 10 includes a fuel vapor treatment system 30, which limits emission of fuel vapor (hereinafter referred to as vapor) generated in the fuel tank 21 into the atmosphere. The fuel vapor treatment system 30 includes a canister 31, which adsorbs vapor generated in the fuel tank 21.

A vapor passage 32 provides communication between the canister 31 and the fuel tank 21. An isolation valve 45 is located in an intermediate section of the vapor passage 32 to open and close the vapor passage 32.

A purge passage 33 provides communication between the canister 31 and the surge tank 16. A purge valve 35 is located in an intermediate section of the purge passage 33 to adjust the flow rate of vapor flowing through the purge passage 33.

The canister 31 is connected to an outside air introduction passage 36, which introduces outside air into the canister 31. The open end of the outside air introduction passage 36 includes an air filter 50. A pump module 40 is located in an intermediate section of the outside air introduction passage 36.

The pump module 40 includes an air pump that reduces the pressure in the canister 31, a switching valve that opens and closes the outside air introduction passage 36, an orifice, and a canister pressure sensor 57 that detects canister pressure PC, which is the pressure in the canister 31. During operation of the engine 10, the air pump of the pump module 40 is off, and the switching valve is maintained to open the outside air introduction passage 36, in other words, maintained to permit introduction of outside air into the canister 31. When an ignition switch 58 is turned off to stop the engine 10, various sequences are executed using the pump module 40 to perform an anomaly diagnosis on the fuel vapor treatment system 30.

The vapor generated in the fuel tank 21 is introduced into the canister 31 from the fuel tank 21 through the vapor passage 32 and temporarily captured by an adsorbent of the canister 31. Since there is a limit to the amount of vapor that the canister 31 can adsorb, the fuel vapor treatment system 30 performs a purging process when predetermined conditions are satisfied. In the purging process, the purge valve 35 is opened while the engine 10 is running, desorbing vapor from the canister 31. The desorbed vapor is introduced into the surge tank 16 through the purge passage 33 and then burned in the combustion chamber 11.

A controller 60, which serves as a control unit, controls the fuel vapor treatment system 30 and the engine 10. The controller 60 may be a processor or processing circuitry that includes a central processing unit (CPU), a read-only memory (ROM), a random-access memory (RAM), a backup RAM, an external input circuit, and an external output circuit.

The controller 60 is connected to various sensors, which detect the running conditions, for example, of the engine 10, the tank pressure sensor 56, the canister pressure sensor 57, the ignition switch 58, which is operated by the driver of the vehicle, and other devices. The controller 60 performs various control processes on the fuel vapor treatment system 30 and the engine 10 based on the signals received from such sensors and switches. The controller 60 may be programmed to perform functions and processes disclosed herein.

As one of the control processes, the controller 60 performs, while the engine 10 is running, a clogging diagnosis process that identifies whether the purge passage 33 is clogged. Specifically, the clogging diagnosis process may be performed when a purging process starts. The clogging diagnosis process will be outlined below.

Figure 2:
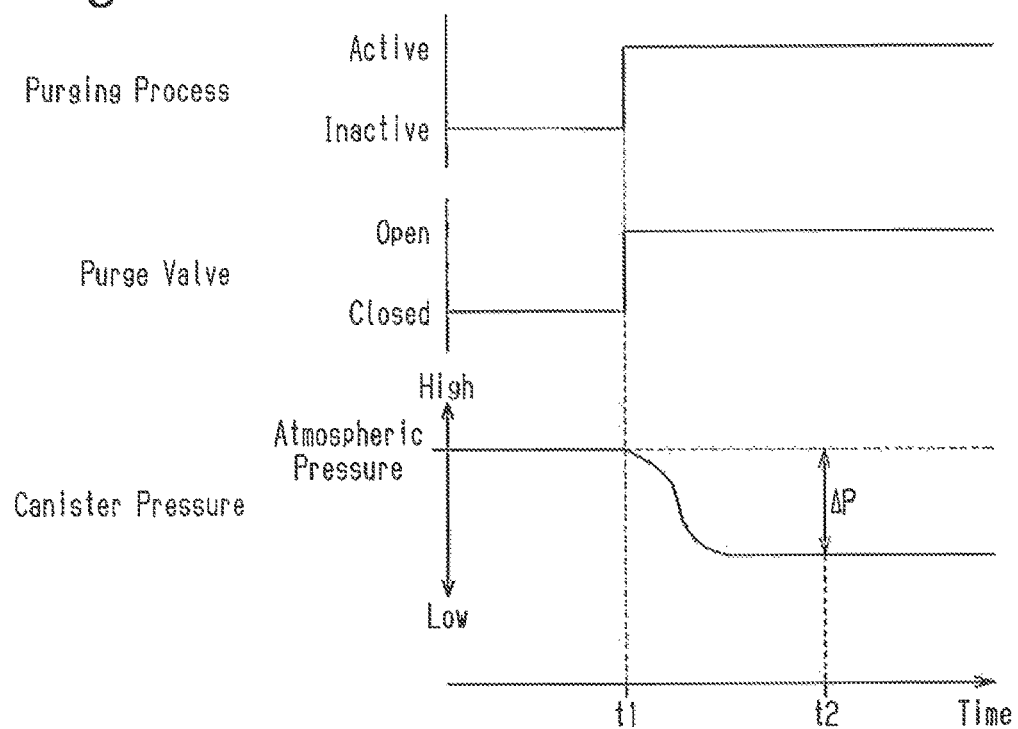
FIG. 2 is a timing chart showing changes in canister pressure after starting a purging process.

As shown in FIG. 2, when the purging process starts and the purge valve 35 is opened at time t1, the negative pressure in the intake passage 14 acts on the pressure in the canister 31, which is equivalent to the atmospheric pressure. This significantly decreases the canister pressure PC after time t1 compared to before starting the purging process. However, if the purge passage 33 is clogged, the amount of vapor flowing through the purge passage 33 is reduced, lowering the decrease amount of the canister pressure PC after starting the purging process.

To perform the clogging diagnosis process, the controller 60 first calculates a pressure decrease amount $\Delta P$ in the canister 31 that results from execution of the purging process. Specifically, the pressure decrease amount $\Delta P$ is the absolute value of the difference between the canister pressure PC that is detected immediately before starting the purging process and the canister pressure PC that is detected when the pressure change becomes stable after starting the purge process. Then, the controller 60 compares the calculated pressure decrease amount $\Delta P$ and a predetermined threshold E and identifies that the purge passage 33 is clogged if the pressure decrease amount $\Delta P$ is less than the threshold E.

The controller 60 may keep the isolation valve 45 closed to minimize vapor flowing from the fuel tank 21 into the canister 31. However, when the isolation valve 45 is kept closed, consumption of the fuel or decrease in the fuel temperature in the fuel tank 21 may generate negative pressure (pressure lower than the atmospheric pressure) in the fuel tank 21. Excessive pressure decrease in the fuel tank 21 generates bubbles in the fuel in the fuel tank 21. Such bubbles may enter the fuel line.

Figure 3:
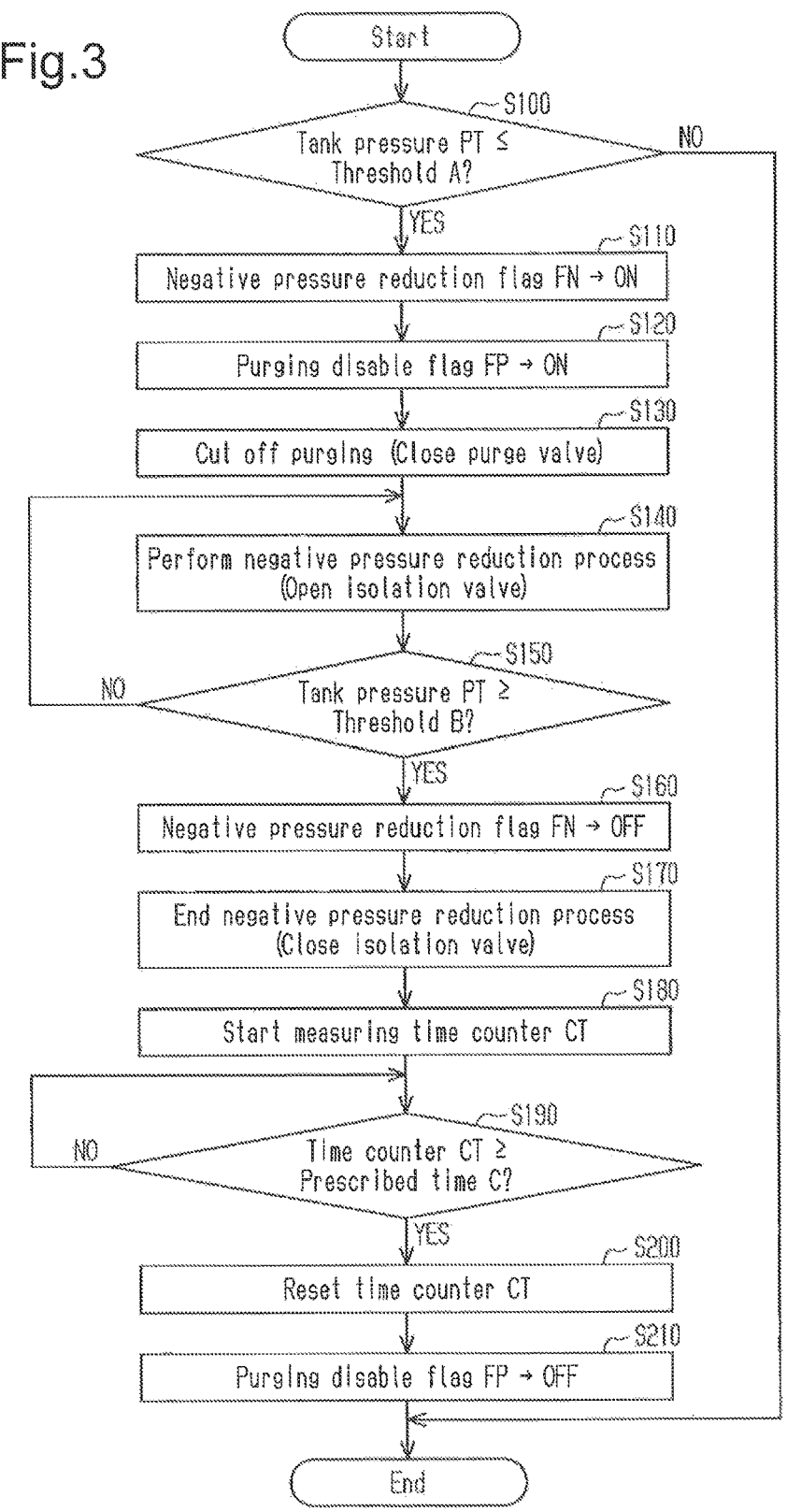
FIG. 3 is a flowchart showing the process sequence of negative pressure reduction control of the embodiment.

Thus, the controller 60 performs negative pressure reduction control to reduce negative pressure in the fuel tank 21. FIG. 3 shows the process sequence for the negative pressure reduction control.

As shown in FIG. 3, the controller 60 first determines whether the tank pressure PT is less than or equal to a threshold A (S100). The threshold A may be a pressure that is less than the atmospheric pressure. More specifically, the threshold A may be a pressure that is greater or slightly greater than the value of the tank pressure PT at which bubbles start to form during the process in which the fuel the pressure in the fuel tank 21 is gradually reduced. The threshold A serves as a first pressure.

If the tank pressure PT is greater than the threshold A (S100: NO), the controller 60 ends the process since there is no probability that bubbles will form in the fuel in the fuel tank 21. When the condition is not satisfied in step S100, the isolation valve 45 remains closed in the normal state.

If the tank pressure PT is less than or equal to the threshold A (S100: YES), the controller 60 sets a negative pressure reduction flag FN to ON (S110). The negative pressure reduction flag FN, which is OFF in the default setting, is set to ON when reduction in the negative pressure in the fuel tank 21, that is, increase in the absolute pressure in the fuel tank 21, is required.

When the negative pressure reduction flag FN is set to ON, the controller 60 then sets a purging disable flag FP to ON. The purging disable flag FP, which is set to OFF in the default setting, is set to ON when the purging process needs to be disabled.

After the purging disable flag FP is set to ON, the controller 60 cuts off purging by closing the purge valve 35 (S130). This disables the purging process.

Since the negative pressure reduction flag FN is ON, the controller 60 then performs the negative pressure reduction process by opening the isolation valve 45 (S140).

Then, the controller 60 determines whether the tank pressure PT after opening the isolation valve 45 is greater than or equal to a threshold B. The threshold B is a pressure that is greater than the threshold A and is less than the atmospheric pressure by a predetermined pressure α. The atmospheric pressure may simply be the standard atmosphere. Alternatively, the threshold B may be a variable that is set to be greater than the threshold A and less than the actual atmospheric pressure by the predetermined pressure α. The actual atmospheric pressure may be detected by connecting the controller 60 to a sensor that detects the atmospheric pressure. The threshold B serves as a second pressure.

If the tank pressure PT is less than the threshold B (S150: NO), the controller 60 repeats the processes of step S140 and step S150 and continues the negative pressure reduction process until the tank pressure PT reaches the threshold B. In other words, the controller 60 keeps the isolation valve 45 open.

If the tank pressure PT is greater than or equal to the threshold B (3150: YE), the controller 60 sets the negative pressure reduction flag FN to OFF (S160). When the negative pressure reduction flag FN is set to OFF, the controller 60 closes the isolation valve 45 and ends the negative pressure reduction process (S170).

When the negative pressure reduction process ends, the controller 60 starts measuring a time counter CT (S180). The time counter CT is a value that indicates the time elapsed since the negative pressure reduction process ends, that is, since the isolation valve 45 is closed.

Then, the controller 60 determines whether the time counter CT becomes greater than or equal to a prescribed time C (S190). The prescribed time C is set as follows.

If the tank pressure PT is determined to be greater than or equal to the threshold B in step S150, the process of step S170 is performed to close the isolation valve 45. When the isolation valve 45 is open, the communication between the fuel tank 21 and the canister 31 through the vapor passage 32 renders the canister pressure PC negative pressure. In addition, the threshold B is less than the atmospheric pressure. Thus, immediately after closing the isolation valve 45, negative pressure is present in the canister 31. However, after closing the isolation valve 45, the outside air introduced into the canister 31 through the outside air introduction passage 36 gradually increases the pressure in the canister 31 toward the atmospheric pressure.

As such, the prescribed time C is set to the time required for the canister pressure PC to reach the atmospheric pressure after closing the isolation valve 45 in step S170. For example, when the minimum time required for the canister pressure PC to reach the atmospheric pressure after closing the isolation valve 45 in step S170 is a minimum time C1, the prescribed time C is set to be the time obtained by adding a predetermined allowance time β to the minimum time C1. Alternatively, the prescribed time C may simply be set to the minimum time C1. In the description above, the atmospheric pressure may refer to a pressure near the atmospheric pressure or, more specifically, a pressure that is near the atmospheric pressure and that does not affect the determination result of the clogging diagnosis process. The atmospheric pressure may also refer to a pressure within a predetermined range of the atmospheric pressure.

If the time counter CT is less than the prescribed time C (S190: NO), the controller 60 repeats the process of step S190 until the time counter CT reaches the prescribed time C.

If the time counter CT is greater than or equal to the prescribed time C (S190: YES), the controller 60 resets the time counter CT to 0 (S200). The controller 60 then sets the purging disable flag FP to OFF (S210) and ends the process.

Alternatively, the controller 60 may set the purging disable flag FP to OFF and then reset the time counter CT to 0 when the time counter CT is greater than or equal to the prescribed time C.

Referring to FIG. 4, the operation of the negative pressure reduction process will now be described. Before time t1 shown in FIG. 4, the purging process is active, and thus the purge valve 35 is open. Consequently, the canister pressure PC is decreased to be equivalent to the pressure of the intake air in the surge tank 16. In addition, the isolation valve 45 is closed to seal the fuel tank 21 before time t1.

As shown in FIG. 4, consumption of the fuel or decrease in the fuel temperature in the fuel tank 21 gradually decreases the tank pressure PT. When the tank pressure PT is decreased to the threshold A at time t1, the negative pressure reduction flag FN is set to ON and the purging disable flag FP is also set to ON.

Setting the purging disable flag FP to ON closes the purge valve 35 and disables the purging process. In addition, setting the negative pressure reduction flag FN to ON opens the isolation valve 45.

At time t1, the purge valve 35 is closed to shut off the communication between the surge tank 16 and the canister 31, momentarily increasing the canister pressure PC. However, the isolation valve 45 is then immediately opened to establish communication between the fuel tank 21 and the canister 31, rapidly decreasing the canister pressure PC toward the tank pressure PT.

The outside air entering the outside air introduction passage 36 is drawn into the fuel tank 21 through the canister 31 and the vapor passage 32. The tank pressure PT and the canister pressure PC gradually increase toward the atmospheric pressure accordingly.

The tank pressure PT thus increases from the pressure of the threshold A after time t1, thereby limiting formation of bubbles in the fuel, which would otherwise be caused by decrease in the pressure in the fuel tank 21.

When the tank pressure PT increases to the threshold B at time t2, the negative pressure reduction flag FN is set to OFF and the isolation valve 45 is closed. Closing the isolation valve 45 stops the introduction of outside air into the fuel tank 21, stopping increase in the tank pressure PT. After time t2, consumption of the fuel or decrease in the fuel temperature in the fuel tank 21 gradually decreases the tank pressure PT again from the pressure of the threshold B.

Measurement of the time counter CT starts when the isolation valve 45 is closed at time t2. Thus, the value of the time counter CT gradually increases after time t2.

When the time counter CT reaches the prescribed time C at time t3, the time counter CT is reset to 0 and the purging disable flag FP is set to OFF. At time t3, since the time counter CT has reached the prescribed time C, the canister pressure PC is the atmospheric pressure.

If the purging process is requested at time t3, the purging process is performed without being disabled since the purging disable flag FP is OFF. This request opens the purge valve 35. When the purging process starts, the clogging diagnosis process is performed. At time t3, the canister pressure PC is the atmospheric pressure as described above. Thus, the pressure decrease amount $\Delta P2$ in the canister 31, which is calculated after time t3, is sufficiently large compared, for example, to the pressure decrease amount $\Delta P1$ in the canister 31, which is calculated when a purging process starts under the condition that the canister pressure PC is negative pressure as indicated by the long dashed double-short dashed line in FIG. 4.

In the negative pressure reduction control, an isolation valve operation process is first performed to open the isolation valve 45 when the tank pressure PT is less than or equal to the threshold A, which is less than the atmospheric pressure, and to close the isolation valve 45 when the tank pressure PT is greater than or equal to the threshold B, which is greater than the threshold A and less than the atmospheric pressure. This maintains the pressure in the fuel tank 21 at a pressure between the threshold A, which is less than the atmospheric pressure, and the threshold B, which is greater than the threshold A and less than the atmospheric pressure, in other words, at negative pressure.

The present embodiment seals the fuel tank 21 by keeping the isolation valve 45 closed, and the pressure in the sealed fuel tank 21 remains less than the atmospheric pressure. This may limit leakage of vapor from the fuel tank 21, to confine vapor within the fuel tank 21.

Further, opening the isolation valve 45 returns the vapor adsorbed by the canister 31 to the fuel tank 21 through the vapor passage 32 together with the outside air entering the outside air introduction passage 36. Returning the vapor from the canister 31 to the fuel tank 21 reduces the amount of vapor adsorbed by the canister 31. This may give the canister 31 room for adsorbing vapor. Thus, the canister 31 may maintain its adsorption capacity even when the purging process is performed less frequently.

In addition, in the negative pressure reduction control, a purging disabling process is performed to disable the purging process by setting the purging disable flag FP to ON in the period from time t1, at which the isolation valve 45 is opened, to time t3, at which the prescribed time C has elapsed since the isolation valve 45 is closed.

The following effects may be achieved by disabling the purging process between time t1 and time t2 in the execution period of the purging disabling process, in other words, by keeping the purge valve 35 closed while the isolation valve 45 is open.

If the isolation valve 45 and the purge valve 35 are both open, the fuel tank 21 is in communication with the surge tank 16. This may move air into the fuel tank 21 from the surge tank 16 when the tank pressure PT is less than the pressure in the surge tank 16. Such a flow of air into the fuel tank 21 from the surge tank 16 may affect the air-fuel ratio of the mixture gas and the amount of fuel vapor introduced into the surge tank 16 and thus into the intake passage 14, for example. This may deteriorate the combustion state of mixture gas.

In contrast, when the purging disabling process is performed, the purging process is disabled while the isolation valve 45 is open from time t1 to time t2. Thus, the purge valve 35 remains closed while the isolation valve 45 is open. This may limit entry of air into the fuel tank 21 from the surge tank 16 caused by opening the isolation valve 45.

The following effects may be achieved by disabling the purging process between time t2 and time t3 in the execution period of the purging disabling process, in other words, by disabling the purging process in the period from when the isolation valve 45 is closed to when the prescribed time C has elapsed since the isolation valve 45 is closed.

The isolation valve operation process closes the isolation valve 45 when the tank pressure PT reaches the threshold B (time t2), and the canister pressure PC immediately after closing the isolation valve 45 is a pressure lower than the atmospheric pressure (negative pressure). Thus, as indicated by the long dashed double-short dashed line in FIG. 4, if a purging process were to start at time t2 by opening the purge valve 35 immediately after closing the isolation valve 45, the canister pressure PC immediately before performing such a purging process would be negative pressure. In this case, the pressure decrease amount $\Delta P1$ in the canister 31 that results from starting the purging process is small. Consequently, the pressure decrease amount $\Delta P1$ may not cross the threshold B in the clogging diagnosis process that is performed when starting the purging process, causing the unclogged purge passage 33 to be wrongly identified as clogged.

In contrast, the negative pressure reduction control, disables the purging process at least in the period from when the isolation valve 45 is closed to when the prescribed time C has elapsed since the isolation valve 45 is closed. That is, the purging process is disabled as long as there is a possibility that negative pressure is present in the canister 31. Thus, when the pressure decrease amount $\Delta P$ in the canister 31 that results from execution of a purging process would be small, the clogging diagnosis process, which determines whether the purge passage 33 is clogged based on the pressure decrease amount $\Delta P$, is not performed. This may reduce situations where the unclogged purge passage 33 is wrongly identified as clogged.

The described embodiments may have the following advantages.

(1) The isolation valve operation process maintains the pressure in the fuel tank 21 at negative pressure. Further, the purging process is disabled in the period from when the isolation valve 45 is closed to when the prescribed time C has elapsed since the isolation valve 45 is closed. Thus, while the purging process is disabled, the clogging diagnosis process, which identifies whether the purge passage 33 is clogged based on the pressure decrease amount ΔP in the canister 31 that results from execution of the purging process, is disabled. This may reduce situations where the unclogged purge passage 33 is wrongly identified as clogged.

(2) The prescribed time C is set to the time required for the pressure in the canister 31 to reach the atmospheric pressure after the isolation valve 45 is closed. Thus, the purging process is disabled until the pressure in the canister 31 reaches the atmospheric pressure. This may reduce wrong diagnoses regarding clogging of the purge passage 33 in a suitable manner.

(3) The purging process is disabled in the period from when the isolation valve operation process opens the isolation valve 45 to when the prescribed time C has elapsed since the isolation valve operation process closes the isolation valve 45. This may limit entry of air into the fuel tank 21 from the surge tank 16 caused by opening the isolation valve 45.

The above described embodiment may be modified as follows.

In the above illustrated embodiment, the purging process is disabled in the period from when the isolation valve operation process opens the isolation valve 45 to when the prescribed time C has elapsed since the isolation valve operation process closes the isolation valve 45 (period from time t1 to time t3 shown in FIG. 4). Instead, the purging process may be disabled at least in the period from when the isolation valve 45 is closed to when the prescribed time C has elapsed since the isolation valve 45 is closed (period from time t2 to time t3 shown in FIG. 4). Such an operation may achieve the advantages described above excluding advantage (3).

The purge passage 33 is connected to the surge tank 16. However, the purge passage 33 may be connected to the intake passage 14 at any location downstream of the throttle valve 17.

Therefore, the present examples and embodiments are to be considered as illustrative and not restrictive and the disclosure is not to be limited to the details given herein.

The invention claimed is:

1. A fuel vapor treatment system comprising:
   a fuel tank that stores fuel for an internal combustion engine;
   a canister that adsorbs fuel vapor generated in the fuel tank;
   a vapor passage that provides communication between the fuel tank and the canister;
   a purge passage that provides communication between the canister and an intake passage of the internal combustion engine;
   an isolation valve that opens and closes the vapor passage;
   a purge valve that adjusts a flow rate of fuel vapor flowing through the purge passage;
   an outside air introduction passage that introduces outside air into the canister;
   a tank pressure sensor that detects pressure in the fuel tank;
   a canister pressure sensor that detects pressure in the canister; and
   an electronic control unit configured to perform:
      a purging process including the electronic control unit opening the purge valve while the internal combustion engine is running to introduce the fuel vapor adsorbed by the canister into the intake passage;
      a diagnosis process including the electronic control unit identifying clogging of the purge passage based on a decrease amount of the pressure in the canister that results from execution of the purging process;
      an isolation valve operation process including the electronic control unit opening the isolation valve when the pressure in the fuel tank is less than or equal to a first pressure, the first pressure being less than an atmospheric pressure, and the electronic control unit closing the isolation valve when the pressure in the fuel tank is greater than or equal to a second pressure, the second pressure being greater than the first pressure and less than the atmospheric pressure; and
      a purging disabling process including the electronic control unit disabling the purging process by closing the purge valve and preventing the purge valve from being opened at least in a period from when the electronic control unit closes the isolation valve in the isolation valve operation process to when a prescribed time has elapsed from the closing of the isolation valve,
   wherein the electronic control unit is configured to open the purge valve to perform the purging process if a predetermined execution condition is satisfied after the prescribed time has elapsed.

2. The fuel vapor treatment system according to claim 1, wherein the prescribed time is set to a time required for the pressure in the canister to reach the atmospheric pressure after the isolation valve is closed.

3. The fuel vapor treatment system according to claim 1, wherein the electronic control unit is configured to perform the purging disabling process in a period from when the electronic control unit opens the isolation valve in the isolation valve operation process to when the prescribed time has elapsed from the closing of the isolation valve.

4. A fuel vapor treatment method comprising:
   storing fuel for an internal combustion engine in a fuel tank;
   adsorbing fuel vapor generated in the fuel tank by a canister;
   providing communication between the fuel tank and the canister via a vapor passage;
   providing communication between the canister and an intake passage of the internal combustion engine via a purge passage;
   opening and closing the vapor passage via an isolation valve;
   adjusting, by a purge valve, a flow rate of fuel vapor flowing through the purge passage;
   introducing outside air into the canister via an outside air introduction passage;
   detecting pressure in the fuel tank via a tank pressure sensor;
   detecting pressure in the canister via a canister pressure sensor;
   performing, by an electronic control unit, a purging process including the electronic control unit opening the purge valve while the internal combustion engine is running to introduce the fuel vapor adsorbed by the canister into the intake passage;
   performing, by the electronic control unit, a diagnosis process including the electronic control unit identifying clogging of the purge passage based on a decrease amount of the pressure in the canister that results from execution of the purging process;
   performing, by the electronic control unit, an isolation valve operation process including the electronic control unit opening the isolation valve when the pressure in the fuel tank is less than or equal to a first pressure, the first pressure being less than an atmospheric pressure, and the electronic control unit closing the isolation valve when the pressure in the fuel tank is greater than or equal to a second pressure, the second pressure being greater than the first pressure and less than the atmospheric pressure;

performing, by the electronic control unit, a purging disabling process including the electronic control unit disabling the purging process by closing the purge valve and preventing the purge valve from being opened at least in a period from when the electronic control unit closes the isolation valve in the isolation valve operation process to when a prescribed time has elapsed from the closing of the isolation valve; and opening, by the electronic control unit, the purge valve to perform the purging process if a predetermined execution condition is satisfied after the prescribed time has elapsed.

5. The fuel vapor treatment method according to claim 4, wherein the prescribed time is set to a time required for the pressure in the canister to reach the atmospheric pressure after the isolation valve is closed.

6. The fuel vapor treatment method according to claim 4, wherein the electronic control unit performs the purging disabling process in a period from when the electronic control unit opens the isolation valve in the isolation valve operation process to when the prescribed time has elapsed from the closing of the isolation valve.

* * * * *